June 27, 1944.  E. A. CAMBURN  2,352,585
SELF-LOCKING TURNBUCKLE
Filed July 3, 1943
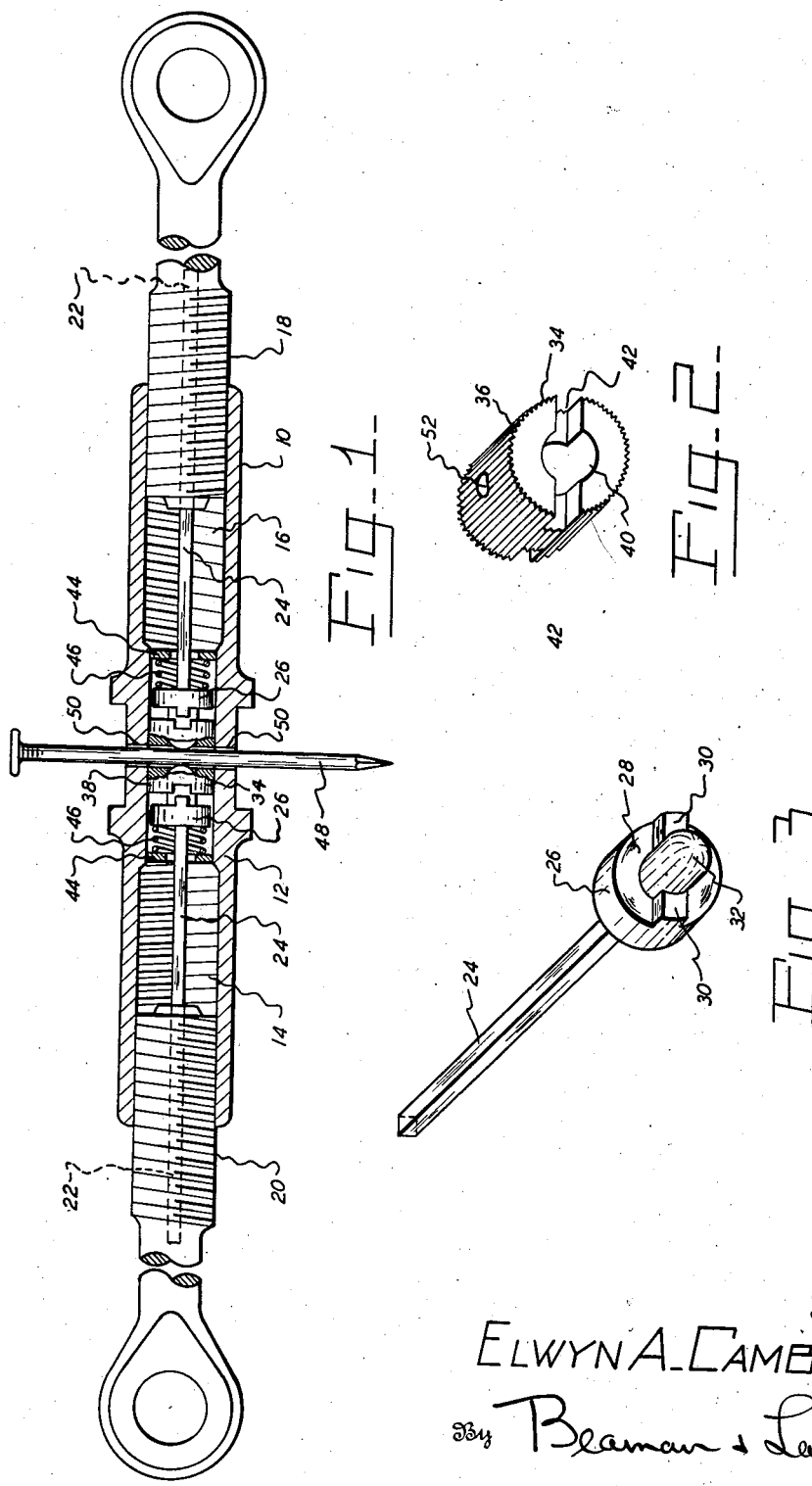
Inventor
ELWYN A. CAMBURN
By Beaman & Langford
Attorney Patented June 27, 1944

2,352,585

UNITED STATES PATENT OFFICE 2,352,585

SELF-LOCKING TURNBUCKLE

Elwyn A. Camburn, Marshall, Mich., assignor to Ronan & Kunzl, Marshall, Mich., a copartnership consisting of K. M. Ronan and A. E. Kunzl Application July 3, 1943, Serial No. 493,417

5 Claims. (Cl. 287—60)

The present invention relates to improvements in self-locking turnbuckles and other similar devices to which the principles of the present invention may readily lend themselves.

One of the objects of the present invention is to provide a safety turnbuckle having improved means for self-locking the turnbuckle in any one of its positions of adjustment.

Another object of the invention is to provide a self-locking device of the character described of such a design that an intrument for unlocking the same may be used for assisting in the tightening and loosening operations.

A still further object of the invention is to provide a safety self-locking turnbuckle or the like that may be readily assembled and is characterized in its operation by the fact that it has a uniform locking action in all positions of adjustment.

These and other objects and advantages residing in the combination, construction and arrangement of parts will more fully appear on consideration of the following specification and the annexed claims.

Referring to the drawing,

Fig. 1 is a side elevational view of a turnbuckle embodying the principles of the present invention, with the threaded sleeve shown in vertical cross section, Fig. 2 is a perspective view of the locking plug removed from the sleeve, and Fig. 3 is a perspective view of the locking pin removed from the sleeve.

Referring to the drawing, the principles of the invention have been shown in connection with a turnbuckle generally designated by reference character 10 and consisting of a sleeve 12 having interiorly threaded portions 14 and 16 at opposite ends of the sleeve 12, the threads being right and left-hand in the usual manner. The threaded eye bolts 18 and 20 each have a central bore 22, which in cross section is preferably complementary to the shaft 24 of the locking pin generally designated by reference character 26. As shown in Fig. 3, the shaft 24 is of square cross section with the result that the cross section of the bore 22 is of similar shape and of such proportions as to permit the shaft 24 of the lock pin 26 to freely slide therein yet closely fitted so as to prevent relative rotation between the shafts 24 and the threaded eye bolts 18 and 20 within the bore 22.

The locking pin 26 has a head portion 28 carrying lugs 30 and the nose part 32.

As more clearly shown in Fig. 2, the locking plug 34 has a serrated outer cylindrical portion 36 which is press fitted to the central bore 38 of the sleeve 12. The central bore 40 of the locking plug 34 acts as a pilot for the nose part 32 of the locking pin 26. Opposite ends of the locking plug 34 are cross slotted at 42 to receive the lugs 30 and present abutment shoulders for interlocking the pin 26 with the locking plug 34.

As shown in Fig. 1, aperture plugs 44 are press fitted into the central bore 38 to provide seats for the springs 46 which continuously act against the heads 28 of the locking pins 26 and urge the locking pins 26 toward the locking plug 34 to bring the lugs 30 into interlocking engagement with the cross slots 42.

When it is desirable to adjust the turnbuckle, some suitable instrumentality, as for instance a nail 48 shown in Fig. 1, is inserted into the cross holes 50 of the sleeve 12 and through an aligned cross hole 52 in the locking plug 34 to engage the opposed nose parts 32 of the locking pin 26 and project the locking pins 26 outwardly sufficiently to cause the lugs 30 to clear the cross slot 42. With the lugs 30 projecting beyond the slots 42, the sleeve 12 can then be rotated in either direction to tighten or loosen the turnbuckle. If desired the nail 48, or other instrumentality, used to unlock the pins 26 to permit rotation of the sleeve 12 relative to the threaded eye bolts 18 and 20, may function as a lever for exerting a mechanical advantage on the sleeve 12.

It will be understood that the shafts 24 telescope within the bores 22 permitting interlocking relation between the pins 26 and the threaded eye bolts 18 and 20 in all positions of threaded adjustment. By seating the spring 46 against the plug 44 in lieu of extending the same against the ends of the threaded eye bolts 18 and 20, the action of the springs 46 against the heads 28 of the pins 26 is the same in all positions of adjustment of the eye bolts 18 and 20 within the sleeve 12. Following adjustment of the turnbuckle, the nail 48 or other suitable instrumentality is withdrawn and the springs 46 urge the locking pins 26 toward the locking plug 34. Should it so happen that the lugs 30 do not at that time come into inner engagement with the slot 42, any relative rotation thereafter that might take place inadvertently between the sleeve 12 and the threaded eye bolts 18 and 20 will result on partial rotation in bringing the lugs 30 into alignment with the slot 42, permitting interlocking engagement under the stress of the spring 46. From this it will be seen that the safety self-locking arrangement has been provided for locking the component parts of the turnbuckle in all positions of adjustment.

Having thus described my invention, what I claim as new and desire to cover by Letters Patent is:

1. In a self-locking device of the character described comprising an interiorly threaded part, an exteriorly threaded part having threaded engagement with said first part, said parts being relatively rotatable to change the overall length of said parts in their associated relation, a locking element for locking said parts against relative rotation, said element including a shaft in sliding telescoping relation with one of said parts, at least certain portions of said shaft and said part with which it has sliding telescopic association being so shaped as to prevent relative rotation between said shaft and its associated part while permitting sliding telescopic movement, means continuously urging said locking element toward locking relation with the other of said parts, there being tongue and slot interlocking parts on said locking element and said other part, whereby said first and second parts are locked against relative rotation, and means associated with said locking element against which a force may be applied to bodily move said element out of locking relation to uncouple said interlocking parts.

2. A safety self-locking turnbuckle comprising a sleeve, opposite ends of said sleeve being internally threaded, a central bore connecting said internally threaded portions of said sleeve, externally threaded parts threaded to opposite ends of said sleeve, locking pins having shaft portions in nonrotatable telescoping relations with said externally threaded parts, locking means located in said central bore of said sleeve, means defining interlocking tongue and groove connections between said locking means and said locking pins at their inner ends, a cross bore in the central portion of said sleeve, projecting portions upon said locking pins, springs for projecting said portions into said cross bore, to bring said tongue and groove elements into interlocking relation with one another to prevent relative rotation between said sleeve and said externally threaded parts, said locking pins being movable out of interlocking relation with said locking means through the thrust of an instrumentality passed through and forcing said projecting portions from said cross bore.

3. A turnbuckle comprising a sleeve having opposite ends thereof internally threaded, externally threaded bolts threaded into said sleeve, locking pins in nonrelative rotatable telescoping relations with said bolts, a cross bore in said sleeve into which portions of said pins project, interlocking parts carried by said sleeve and locking pins to prevent relative rotation, said bore and projecting portions being so relatively positioned as to enable the latter to be forced outwardly to unlock said interlocking parts on the passage of a suitable instrumentality through said cross bore.

4. A trunbuckle comprising a central part, end parts adjustably associated with the central part and adapted to shorten and lengthen the overall length upon relative rotation between said parts, a cross bore in said central part adapted to receive a lever rod, locking means associated with said parts, said means in one position interlocking said parts against relative rotation and in another position permitting relative rotation between said parts, said locking means having portions projecting into said cross bore when in a position locking said parts against relative rotation, movement of said lever rod through said cross bore forcing said locking means out of locking relation with said central part to permit relative adjusting movement between said parts.

5. A turnbuckle comprising a sleeve having opposite ends thereof internally threaded, bolts externally threaded and operating within said sleeve, a cross bore in the central portion of said sleeve, locking means associated with said threaded bolts, resilient means projecting said locking means into said cross bore, interlocking means between said sleeve and locking means to prevent relative rotation between said sleeve and threaded bolts with a portion of said locking means projecting in said cross bore, insertion of a tool through said cross bore acting upon the portions of said locking means projecting therein to move the same to a nonlocking position.

ELWYN A. CAMBURN.